US006175956B1

(12) United States Patent
Hicks et al.

(10) Patent No.: US 6,175,956 B1
(45) Date of Patent: Jan. 16, 2001

(54) METHOD AND COMPUTER PROGRAM PRODUCT FOR IMPLEMENTING METHOD CALLS IN A COMPUTER SYSTEM

(75) Inventors: Daniel Rodman Hicks, Byron; William Jon Schmidt, Rochester, both of MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/115,717

(22) Filed: Jul. 15, 1998

(51) Int. Cl.[7] .................................................. G06F 9/45
(52) U.S. Cl. .......................................... 717/5; 717/9
(58) Field of Search ................................ 717/4, 5, 9, 8

(56) References Cited

U.S. PATENT DOCUMENTS

| | | | |
|---|---|---|---|
| 5,222,221 | * 6/1993 | Houri et al. | 709/106 |
| 5,740,443 | * 4/1998 | Carini | 717/5 |
| 5,768,595 | * 6/1998 | Gillies | 717/9 |
| 5,787,285 | * 7/1998 | Lanning | 717/4 |
| 5,828,883 | * 10/1998 | Hall | 717/4 |
| 5,857,097 | * 1/1999 | Henzinger et al. | 712/236 |
| 5,857,103 | * 1/1999 | Grove | 717/5 |
| 5,896,538 | * 4/1999 | Blandy et al. | 717/4 |
| 5,915,250 | * 6/1999 | Jain et al. | 717/100 |
| 5,940,618 | * 8/1999 | Blandy et al. | 717/4 |
| 5,940,622 | * 8/1999 | Patel | 717/9 |
| 5,963,740 | * 10/1999 | Srivastava et al. | 717/4 |
| 5,966,537 | * 10/1999 | Ravichandran | 717/9 |
| 5,983,020 | * 11/1999 | Sweeney et al. | 717/5 |
| 6,026,234 | * 2/2000 | Hanson et al. | 717/4 |
| 6,029,004 | * 2/2000 | Bortnikov et al. | 717/9 |
| 6,072,951 | * 6/2000 | Donovan et al. | 717/9 |

OTHER PUBLICATIONS

Title: Call Path Profiling, author: Hall et al, published in ACM, 1992.*
Title: X.25 Over an SNA Network, call Regulation System, IBM Technical Disclosure Bulletin, May 1987.*
Title: Automatic Routing of X.25 Virtual Calls, IBM Technical Disclosure Bulletin, Apr., 1990.*

* cited by examiner

Primary Examiner—Kakali Chaki
Assistant Examiner—Chameli C. Das
(74) Attorney, Agent, or Firm—Joan Pennington (57) ABSTRACT

A computer implemented method and computer program compiler product are provided for implementing method calls in a computer system. Virtual method calls are identified in an intermediate instruction stream representation. Responsive to an identified virtual method call, profile data for the identified call site are read. A most frequently called procedure for the identified call site is compared with a first threshold value. Responsive to the most frequently called procedure being called less than the first threshold value, the virtual method call is maintained in a revised instruction stream representation. Responsive to the most frequently called procedure being called greater than or equal to the first threshold value, a guarded call to the most frequently called procedure is inserted at the identified call site in the revised instruction stream representation. In accordance with features of the invention, checking whether one object type accounts for more than a second threshold value of the calls to the most frequently called procedure at the identified call site is performed. Responsive to one object type accounting for more than or equal to the second threshold value, a type guard and a call to the most frequently called procedure are inserted at the identified call site in the revised instruction stream representation. Responsive to one object type accounting for less than the second threshold value, an address guard and a call to the most frequently called procedure are inserted at the identified call site in the revised instruction stream representation.

13 Claims, 6 Drawing Sheets

FIGURE 1

PROFILE DATA TABLE 200

| CALLED PROCEDURE ADDRESS 202 | OBJECT TYPE 204 | INVOCATION COUNT 206 |
|---|---|---|
| A. F00 | A | 2100 |
| A. F00 | B | 200 |
| C. F00 | C | 300 |
| D. F00 | D | 5 |

METHOD AND COMPUTER PROGRAM PRODUCT FOR IMPLEMENTING METHOD CALLS IN A COMPUTER SYSTEM

FIELD OF THE INVENTION

The present invention relates to the data processing field and compiler optimization techniques, and more particularly, relates to a method and computer program product for implementing method calls in a computer system.

DESCRIPTION OF THE RELATED ART

A pervasive feature of object oriented languages such as Java and C++ is the virtual method call. By default, classes in these languages can be inherited from or subclassed. A variable whose type is a given class may, during run time, reference an instance of that class or of any subclass of that class. A subclass can override a method inherited from its parent class with a different implementation specific to that class. A method that can be overridden is called a virtual method. Because objects of different exact type may be referenced by a single variable, access to methods associated with a variable must be done indirectly. Typically the object associated with the variable contains a reference to a data structure kept with its class and known as a virtual method table, containing slots that point to the actual methods to be called.

Thus a virtual method call is more expensive than a procedure call in which the target procedure is known at compile time (a so-called bound call). Not only is it more costly to perform the indirection to find the method address, but the presence of this indirection inhibits optimization. For example, the targeted method body cannot be inlined, even though it may be that there is only one method that could be called from a given call site. Since virtual method calls typically occur frequently, any speedup of the virtual call mechanism can produce noticeable performance improvements.

Devirtualization is a technique for replacing a virtual method call with one or more bound procedure calls. Devirtualization relies upon knowing which potential targets are most likely to be called at a given call site. This data is usually obtained using some form of program profiling. In its simplest form, a virtual call to a.foo() that usually ends up calling Y.foo() (where a is of type X, and Y is a subclass of X) can be replaced by:

if (guard) then
  Y.foo();
else
  a.foo();
end if;

Here guard is a conditional test that determines whether Y.foo() is really the correct method to call. For this to be profitable, the cost of testing the guard condition and performing the bound call must be less expensive than the original virtual call. Devirtualization is thus most useful when the known call target, Y.foo() in the above example, can be inlined at the call site, removing the procedure call/return overhead and often improving other optimization opportunities.

If a virtual call site has more than one common target, it may sometimes be profitable to use a chain of tests; for example:

if (guard1) then
  Y.foo();
else if (guard2) then
  Z.foo();
else
  a.foo();
end if;

Two kinds of guard conditions have been used in existing systems. One possibility is to test directly whether the address of the procedure in the virtual call table is equal to the address of the expected procedure. This may appear to not be profitable, since once the address has been computed the procedure can simply be called, and so little saving is apparent. However, if the expected procedure can be inlined and further optimized, this technique can still be profitable. In the past, it has been used chiefly when type information is not available. An example environment for this is C++ without RTTI.

A guard condition that is often more efficient is available when each object has an associated runtime type. The type of the object can typically be assessed more quickly than the virtual function address with at least one less indirection. Thus we can test whether the type of the current object is equal to the type of the expected object at lower cost than the address test.

Previous systems have used one or the other of these guard conditions, but not both. However, neither of these guard conditions is always the best choice. Typically the address test has been avoided when type information is available, since it is apparently less expensive, but an example will illustrate that the address test is sometimes preferable as follows.

Suppose that profile data indicates that a virtual call site invokes X.foo() 65% of the time, Y.foo() 30% of the time, and other procedures the remaining 5% of the time. Suppose further that Y is a subclass of X that overrides foo. Then one of the following code snippets in table 1 or table 2 could be generated using type tests:

TABLE 1

| |
|---|
| if(a.type == X) then<br>  X.foo();<br>else<br>  a.foo();<br>end if; |

TABLE 2

| |
|---|
| if (a.type == X) then<br>  X.foo();<br>else if (a.type == Y) then<br>  Y.foo();<br>else<br>  a.foo();<br>end if; |

The type tests are cheaper than the address testing of whether a.foo==X.foo, etc. However, now suppose that Y does not override foo. Then X.foo and Y.foo are really the same function. In the table 1 code snippet, an object of type Y will fail the type test and use the indirect virtual call, despite the fact that X.foo() is the correct function to be called. In the table 2 code snippet, an object of type Y will require two type tests before calling the correct function, instead of just one. Furthermore, inlining both X.foo and Y.foo needlessly doubles the amount of code bloat incurred, since both are the same function.

This illustrates that using either address information or type information is not sufficient. A need exists for a flexible method for devirtualization of virtual method calls.

SUMMARY OF THE INVENTION

A principal object of the present invention is to provide a method and computer program product for implementing method calls in a computer system. Other important objects of the present invention are to provide such method and computer program product for implementing method calls substantially without negative effect and that overcome many of the disadvantages of prior art arrangements.

In brief, a computer implemented method and computer program compiler product are provided for implementing method calls in a computer system. Virtual method calls are identified in an intermediate instruction stream representation. Responsive to an identified virtual method call, profile data for the identified call site are read. A most frequently called procedure for the identified call site is compared with a first threshold value. Responsive to the most frequently called procedure being called less than the first threshold value, the virtual method call is maintained in a revised instruction stream representation. Responsive to the most frequently called procedure being called greater than or equal to the first threshold value, a guarded call to the most frequently called procedure is inserted at the identified call site in the revised instruction stream representation.

In accordance with features of the invention, checking whether one object type accounts for more than a second threshold value of the calls to the most frequently called procedure at the identified call site is performed. Responsive to one object type accounting for more than or equal to the second threshold value, a type guard and a call to the most frequently called procedure are inserted at the identified call site in the revised instruction stream representation. Responsive to one object type accounting for less than the second threshold value, an address guard and a call to the most frequently called procedure are inserted at the identified call site in the revised instruction stream representation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
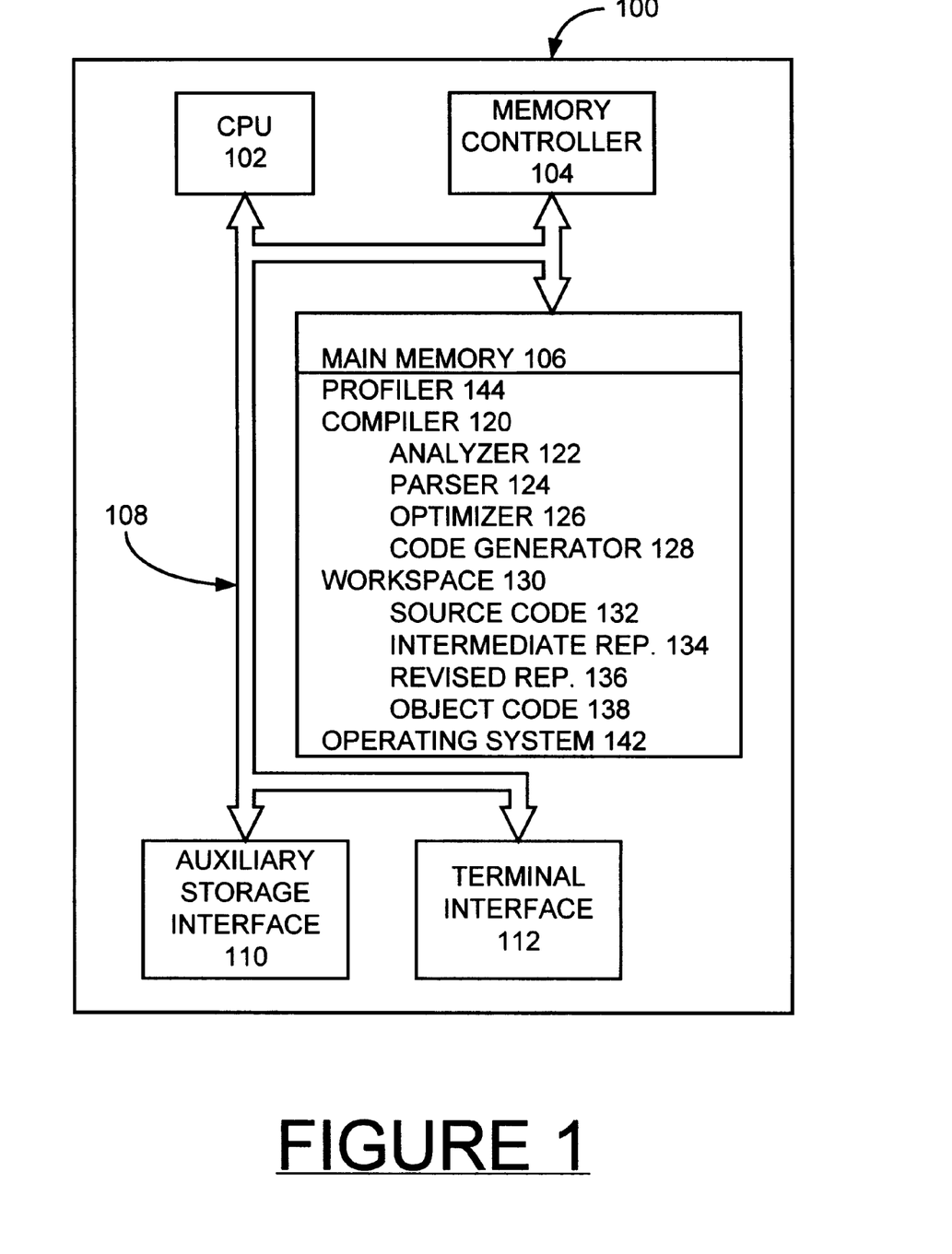
FIG. 1 is a block diagram representation illustrating a computer system for implementing compiler optimization methods and a computer program product for selective devirtualization of virtual method calls in a computer system in accordance with a preferred embodiment of the present invention.

Having reference now to the drawings, in FIG. 1, there is shown a computer or data processing system of the preferred embodiment generally designated by the reference character 100. As shown in FIG. 1, computer system 100 includes a central processor unit (CPU) 102, a memory controller 104 coupled to a main memory 106 via a system bus 108. CPU 102, memory controller 104 and main memory 106 are connected to an auxiliary storage interface 110 and a terminal interface 112 via the system bus 108.

As shown in FIG. 1, computer system 100 includes a compiler 120 residing within the main memory 106. Compiler 120 comprises an analyzer 122, a parser 124, an optimizer 126 and a code generator 128. Computer system 100 includes a workspace 130 for storing a source code representation 132, an intermediate representation 134, a revised representation 136 and an object code representation 138. The analyzer 122 analyzes the program, performing syntactic and semantic analysis to check the source program input for errors and to determine its meaning. The parser 124 typically uses a context-free grammar to determine if program statements satisfy a set of grammar rules and builds constructs. The parser 124 then generates the intermediate representation 134. The optimizer 126 operates on the intermediate representation 134 to generate the optimized or revised representation 136. The code generator 128 converts the revised representation 136 into object code 138 or the actual program that a computer can execute. Computer system 100 includes an operating system 142 supporting the compiler 120 and a profiler 144 for generating data about a program's runtime behavior known as profile data as illustrated and described with respect to a profile data table 200 in FIG. 2. It should be understood that features of the preferred embodiment apply to various types of compilers 120 and profilers 144. Compiler 120 may reside within memory 106 of computer 100 or may reside on a separate computer system. Profiler 144 can be included within compiler 120 or may be a separate computer program providing profile data 200 utilized by the compiler 120. Not all parts of compiler 120 or profiler 144 need reside in main memory 106 at any given time. Parts of compiler 120 and profiler 144 typically reside in auxiliary storage and are brought into main memory 106 when needed.

Various commercially available processors could be used for computer system 100, for example, an IBM personal computer or similar workstation can be used. Central processor unit 102 is suitably programmed to generate the profile data 200 of FIG. 2 and to execute the flowchart of FIGS. 3, 4 and 5 of the preferred embodiment.

In accordance with features of the preferred embodiment, enhanced profile data 200 is collected at each virtual method call site. Each time the call site executes, the profiler 144 records both the identity or address of the called procedure and the type of the object on whose behalf it was called. During subsequent compilation, the profile data 200 is consulted to determine what sort of code to generate at the call site. Possibilities include leaving the call as a virtual call, or replacing it with one or more guarded bound calls, leaving the virtual call as a backup. A guard may be either an address guard or a type guard, and both types of guard may occur at the same call site. Any set of heuristics can be used to determine which form should be generated at a given call site.

Figure 2:
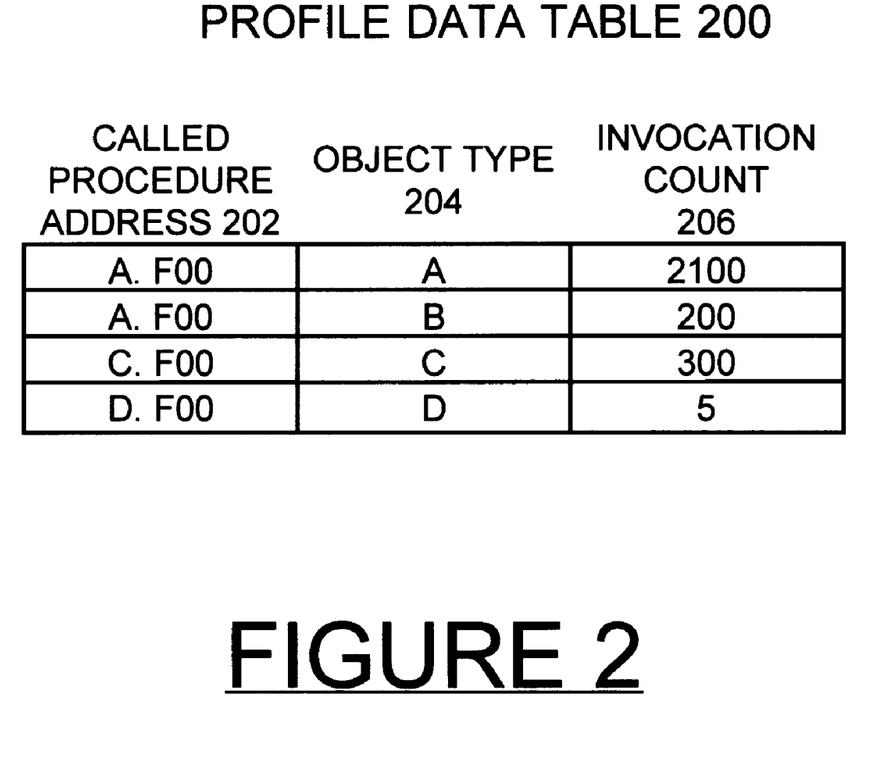
FIG. 2 is a block diagram representation illustrating a call profile data table structure of the preferred embodiment.

Referring to FIG. 2, profiling information is stored in a profile data table 200, each entry of which contains a called procedure address 202, an object type 204, and an invocation count 206. A separate table 200 exists in the profile data for each virtual call site. Note that the same procedure address, such as A.FOO, may appear in several entries in the same profile data table 200, if it is called on behalf of different object types. This corresponds to a procedure that was inherited but not overridden. For example, in profile data table 200 of FIG. 2, object type B inherits method FOO from A but does not override it.

Figure 3:
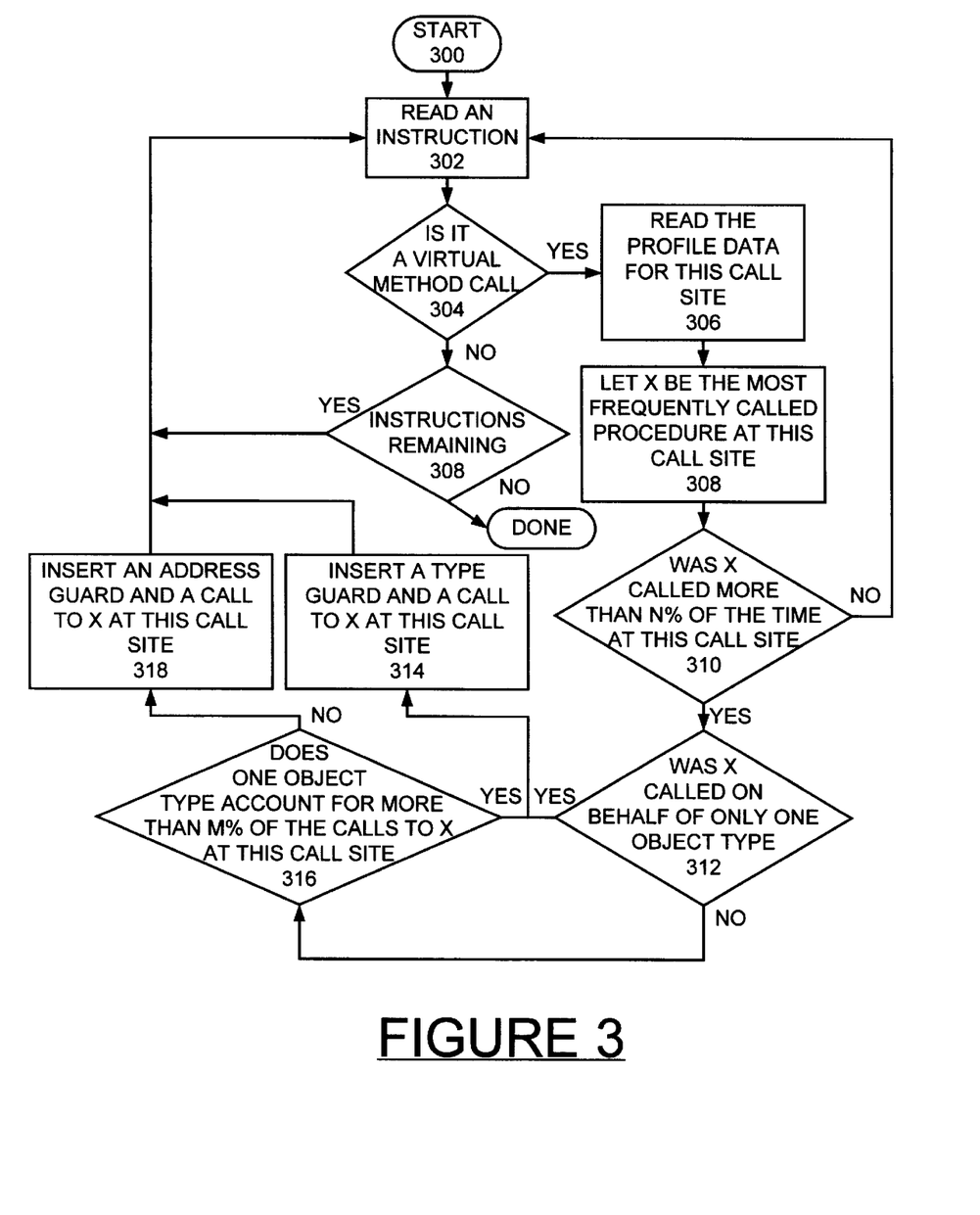
FIGS. 3, 4 and 5 are flow diagrams illustrating methods for selective devirtualization of virtual method calls in a computer system in accordance with a preferred embodiment of the present invention.
Figure 4:
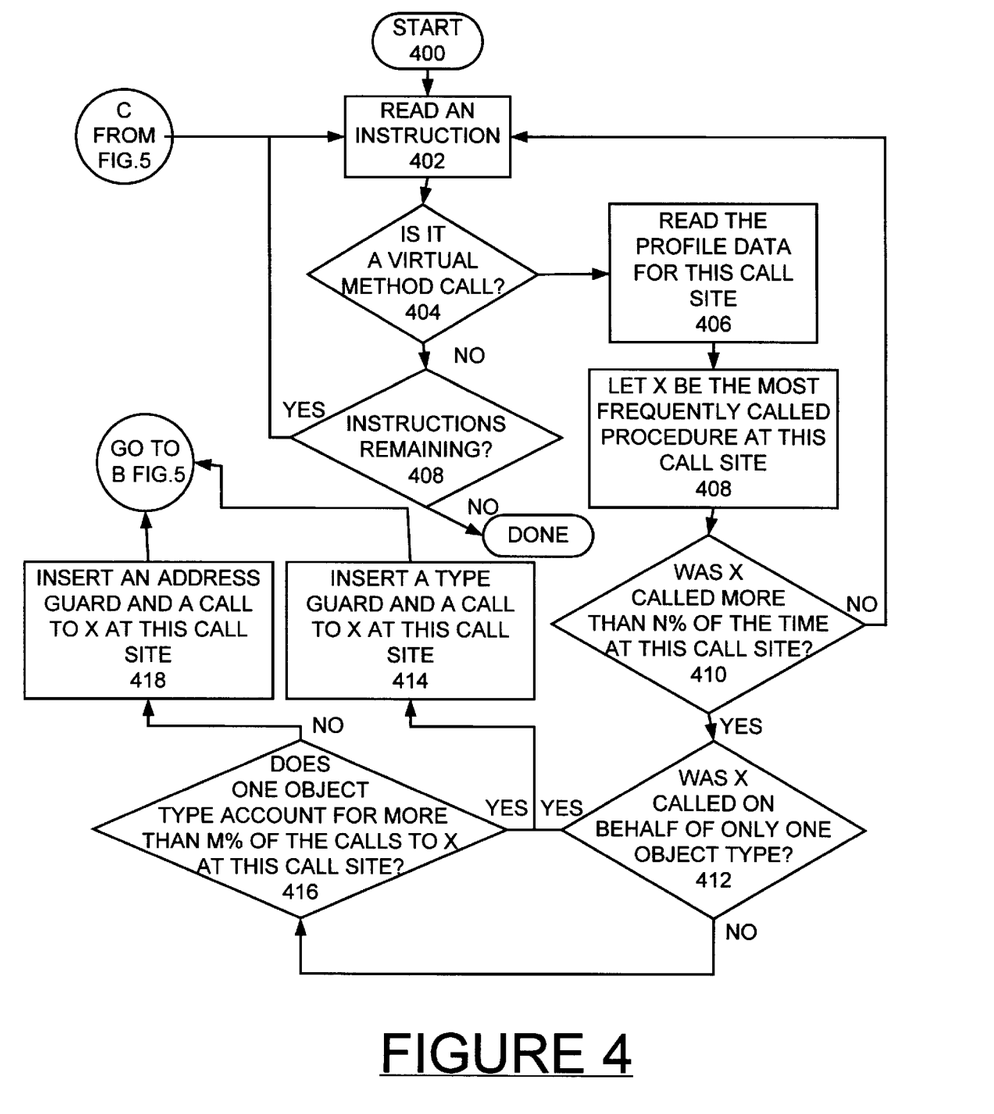
Figure 5:
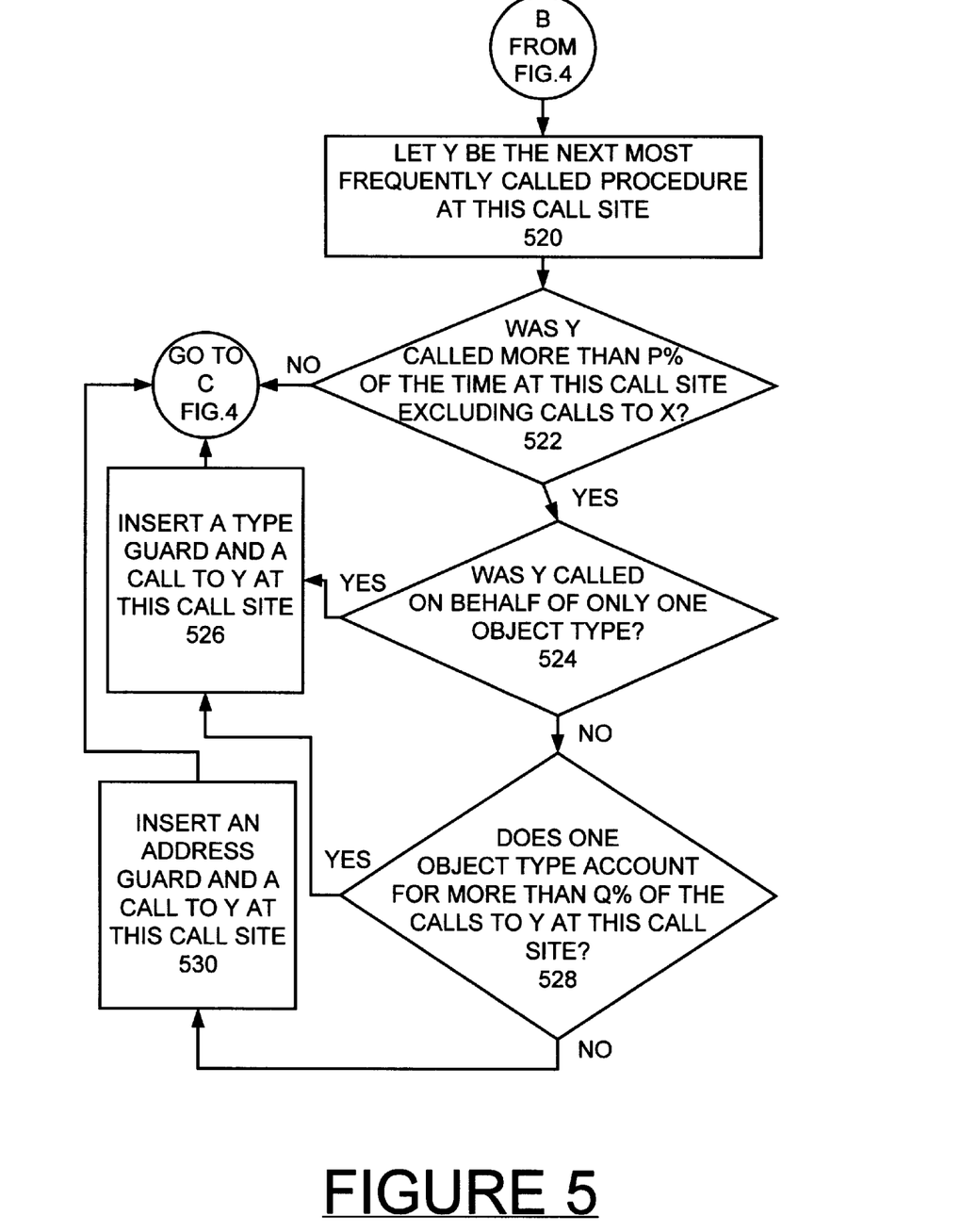

FIGS. 3, 4 and 5 illustrate methods for devirtualization of virtual method calls in a computer system in accordance with preferred embodiments of the present invention.

FIG. 3 illustrates optimizing compiler steps for transforming an intermediate form of an instruction stream containing virtual method calls into a semantically equivalent instruction stream in which one or more virtual method call are replaced by devirtualized calls. Referring now to FIG. 3, the sequential operations begin at a block 300. An instruction is read as indicated at a block 302. If a virtual method call is identified at a decision block 304, then the profile data for this call site are read as indicated at a block 306. Otherwise checking for remaining instructions is performed as indicated at a decision block 308, If instructions remain, then a next instruction is read at block 302. To determine whether any devirtualization should be done at this call site, the invocation counts 206 for each procedure address 202 are identified. X represents the most frequently called procedure as indicated at a block 308. Checking whether the most frequently called procedure address X was called more than a set percentage N % of the time at this call site is determined as indicated at a decision block 310. If no procedure address accounts for at least N % of the total invocation, the call is left as a virtual call. Then the sequential operations return to block 302 to read a next instruction. Otherwise the most frequently called procedure address X is turned into a bound call to the procedure address X.

When the most frequently called procedure address X was called more than the set percentage N % of the time at this call site, then checking whether the most frequently called procedure address X was called on behalf of one object type is performed as indicated at a decision block 312. If the most frequently called procedure address X was called on behalf of one object type 204, then a type guard and a bound call to procedure address X is inserted at this call site as indicated at a block 314. Otherwise if the most frequently called procedure address X was called on behalf of more than one object type, checking whether one object type 204 accounts for more than a set percentage M % of the calls to the called procedure address X is performed as indicated at a decision block 316. If one object type 204 accounts for more than a set percentage M % of the calls to the called procedure address X, then a type guard and a bound call to procedure address X is inserted at this call site as before at block 312. Otherwise if one object type 204 does not account for more than a set percentage M % of the calls to the called procedure address X, then an address guard and a bound call to procedure address X is inserted at this call site as before at block 318. Then the sequential operations return to block 302 to read a next instruction.

In other words, if the called procedure address 202 was called on behalf of more than one object type 204, but the invocation counts 206 for all but one are negligible using the threshold M %, the bound call is preceded by a type guard inserted at block 314. Otherwise the bound call is preceded by an address guard at block 318.

Referring now to FIGS. 4 and 5, sequential operations are shown for devirtualization of method calls including an additional decision of whether to have a secondary guard. This is done by checking whether another procedure address accounts for at least a predetermined threshold P % of the remaining invocations, for some appropriate threshold P. In FIG. 4, the same sequential steps as in FIG. 3 are performed up to the insertion of a type guard and a call to the procedure X at block 414 and the insertion of an address guard and a call to the procedure X at block 418. Then following entry point B in FIG. 5, Y is set to represent the next most frequently called procedure address at this call site as indicated at a block 520. When the next most frequently called procedure address Y was called more than the set percentage P % of the time at this call site, then checking whether the next most frequently called procedure address Y was called on behalf of one object type 204 is performed as indicated at a decision block 524. If the next most frequently called procedure address Y was called on behalf of one object type 204, then a type guard and a bound call to procedure address Y is inserted at this call site as indicated at a block 526. Otherwise if the next most frequently called procedure address Y was called on behalf of more than one object type, checking whether one object type 204 accounts for more than a set percentage Q % of the calls to the called procedure address Y is performed as indicated at a decision block 528. If one object type 204 accounts for more than a set percentage Q % of the calls to the called procedure address Y, then a type guard and a bound call to procedure address Y is inserted at this call site as before at block 526. Otherwise if one object type 204 does not account for more than the set percentage Q % of the calls to the called procedure address Y, then an address guard and a bound call to procedure address Y is inserted at this call site as before at block 530. Then the sequential operations return to block 402 in FIG. 4 to read a next instruction.

Figure 6:
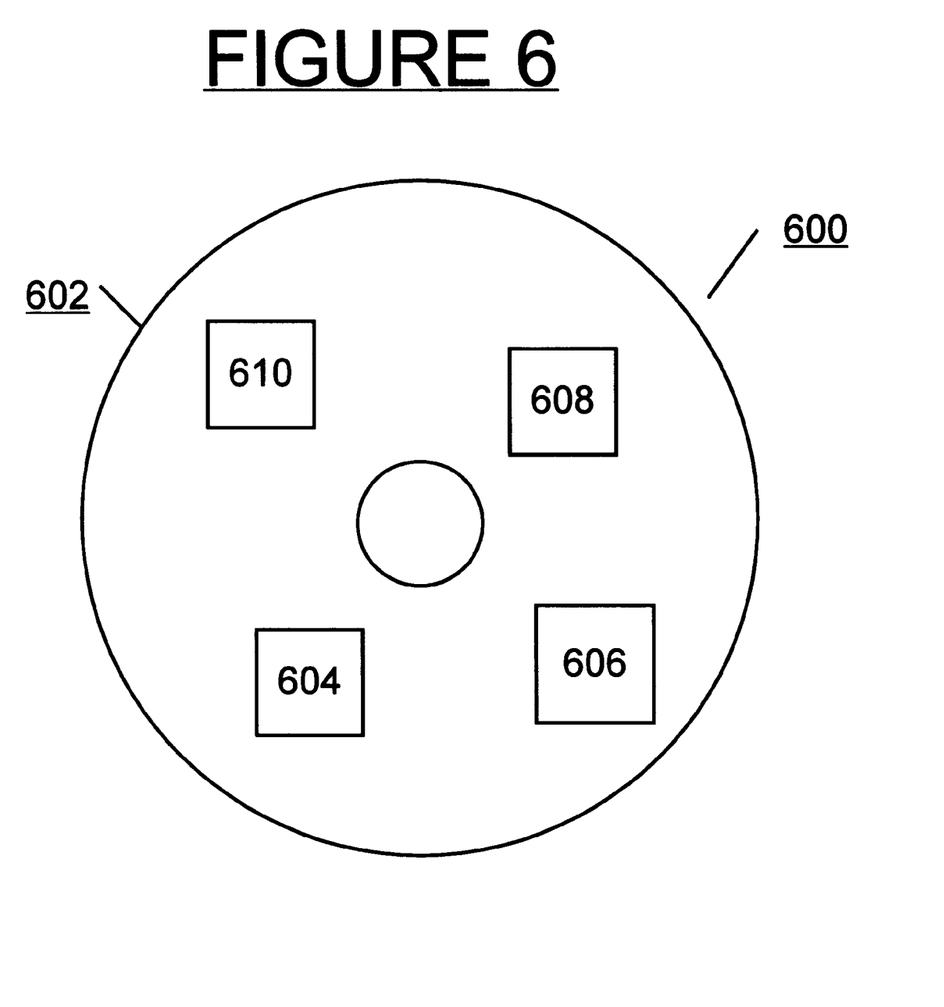
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 606, 604, 608, 610 on the medium 602 for carrying out the methods for implementing method calls of the preferred embodiment in the system 100 of FIG. 1.

A sequence of program instructions or a logical assembly of one or more interrelated modules defined by the recorded program means 606, 604, 608, 610, direct the computer system 100 for implementing method calls of the preferred embodiment.

While the present invention has been described with reference to the details of the embodiments of the invention shown in the drawing, these details are not intended to limit the scope of the invention as claimed in the appended claims.

What is claimed is:

1. A computer implemented method for implementing method calls in a computer system comprising the steps of:

identifying a virtual method call in an intermediate instruction stream representation;

responsive to an identified virtual method call, reading profile data for the identified call site of the identified virtual method call;

comparing a most frequently called procedure for the identified call site with a first threshold value;

responsive to the most frequently called procedure for the identified call site being called less than the first threshold value, maintaining the virtual method call in a revised instruction stream representation; and responsive to the most frequently called procedure for the identified call site being called greater than or equal to the first threshold value, devirtualizing the identified virtual method call and replacing the identified virtual method call by inserting a guarded call to the most frequently called procedure at the identified call site in the revised instruction stream representation.

2. A computer implemented method for implementing method calls as recited in claim 1 wherein the step of inserting said guarded call to the most frequently called procedure in the revised instruction stream representation includes the step of:

checking whether one object type accounts for more than a second threshold value of the calls to the most frequently called procedure at the identified call site.

3. A computer implemented method for implementing method calls as recited in claim 2 further includes the step of:

responsive to one object type accounting for more than or equal to the second threshold value, inserting a type guard and a call to the most frequently called procedure at the identified call site in the revised instruction stream representation; and responsive to one object type accounting for less than the second threshold value, inserting an address guard and a call to the most frequently called procedure at the identified call site in the revised instruction stream representation.

4. A computer implemented method for implementing method calls as recited in claim 1 further includes the step of:

comparing a next most frequently called procedure for the identified call site with a third threshold value.

5. A computer implemented method for implementing method calls as recited in claim 4 further includes the step of:

responsive to the next most frequently called procedure for the identified call site being called greater than or equal to the third threshold value, inserting a guarded call to the next most frequently called procedure at the identified call site in the revised instruction stream representation.

6. A computer implemented method for implementing method calls as recited in claim 5 wherein the step of inserting a guarded call to the next most frequently called procedure at the identified call site in the revised instruction stream representation includes the step of:

checking whether one object type accounts for more than a fourth threshold value of the calls to the next most frequently called procedure at the identified call site.

7. A computer implemented method for implementing method calls as recited in claim 6 further includes the step of:

responsive to one object type accounting for more than or equal to the fourth threshold value, inserting a type guard and a call to the next most frequently called procedure at the identified call site; and responsive to one object type accounting for less than the fourth threshold value, inserting an address guard and a call to the next most frequently called procedure at the identified call site.

8. A computer program product for use in a computer system comprising:

a recording medium;

means, recorded on the recording medium, for identifying a virtual method call in an intermediate instruction stream representation;

means, recorded on the recording medium, responsive to an identified virtual method call, for reading profile data for the identified call site of the identified virtual method call;

means, recorded on the recording medium, for comparing a most frequently called procedure for the identified call site with a first threshold value;

means, recorded on the recording medium, responsive to the most frequently called procedure for the identified call site being called less than the threshold value, for maintaining the virtual method call in a revised instruction stream representation; and means, recorded on the recording medium, responsive to the most frequently called procedure for the identified call site being called greater than or equal to the threshold value, for devirtualizing the identified virtual method call and replacing the identified virtual method call by inserting a guarded call to the most frequently called procedure in the revised instruction stream representation.

9. A computer program product as recited in claim 8 further includes means, recorded on the recording medium, for comparing a next most frequently called procedure for the identified call site with a second threshold value; and means, recorded on the recording medium, responsive to the next most frequently called procedure for the identified call site being called greater than or equal to the second threshold value, for inserting a guarded call to the next most frequently called procedure at the call site in the revised instruction stream representation.

10. A computer program compiler product for transforming an intermediate representation of an instruction stream containing virtual method calls into a revised instruction stream representation, said computer program compiler product including a plurality of computer executable instructions stored on a computer readable medium, wherein said instructions, when executed by said computer, cause the computer to perform the steps of:

identifying a virtual method call in the intermediate instruction stream representation;

responsive to an identified virtual method call, reading profile data for the identified call site of the identified virtual method call;

comparing a most frequently called procedure for the identified call site with a first threshold value;

responsive to the most frequently called procedure for the identified call site being called less than the first threshold value, maintaining the virtual method call in the revised instruction stream representation; and responsive to the most frequently called procedure for the identified call site being called greater than or equal to the first threshold value, devirtualizing the identified virtual method call and replacing the identified virtual method call by inserting a guarded call to the most frequently called procedure at the identified call site in the revised instruction stream representation.

11. A computer program compiler product as recited in claim 10 wherein the step of inserting said guarded call to the most frequently called procedure includes the steps of:

checking whether one object type accounts for more than a second threshold value of the calls to the most frequently called procedure at the identified call site;

responsive to one object type accounting for more than or equal to the second threshold value, inserting a type guard and a call to the most frequently called procedure at the identified call site in the revised instruction stream representation; and responsive to one object type accounting for less than the second threshold value, inserting an address guard and a call to the most frequently called procedure at the identified call site in the revised instruction stream representation.

12. A computer program compiler product as recited in claim 10 wherein said instructions, when executed by said computer, further cause the computer to perform the steps of:

comparing a next most frequently called procedure for the identified call site with a third threshold value; and responsive to the next most frequently called procedure for the identified call site being called greater than or equal to the third threshold value, inserting a guarded call to the next most frequently called procedure at the identified call site in the revised instruction stream representation.

13. A computer program compiler product as recited in claim 10 wherein the step of inserting a guarded call to the next most frequently called procedure at the identified call site in the revised instruction stream representation includes the steps of:

checking whether one object type accounts for more than a fourth threshold value of the calls to the next most frequently called procedure at the identified call site;

responsive to one object type accounting for more than or equal to the fourth threshold value, inserting a type guard and a call to the next most frequently called procedure at the identified call site; and responsive to one object type accounting for less than the fourth threshold value, inserting an address guard and a call to the next most frequently called procedure at the identified call site.

* * * * *